United States Patent
Pisupati et al.

(10) Patent No.: US 11,488,204 B2
(45) Date of Patent: Nov. 1, 2022

(54) NETWORK MANAGEMENT BASED ON MARKETING MESSAGE FATIGUE

(71) Applicant: Oracle America, Inc., Redwood Shores, CA (US)

(72) Inventors: Chandra Sekhar Pisupati, Santa Clara, CA (US); Karempudi V. Ramarao, San Ramon, CA (US); Preethika Sathyamangalam Kalyanasundaram, Seattle, WA (US); Samba Reyes Njie, Jr., Foster City, CA (US)

(73) Assignee: Oracle America, Inc., Redwood Shores, CA (US)

( * ) Notice: Subject to any disclaimer, the term of this patent is extended or adjusted under 35 U.S.C. 154(b) by 0 days.

(21) Appl. No.: 16/934,938

(22) Filed: Jul. 21, 2020

(65) Prior Publication Data

US 2022/0027946 A1  Jan. 27, 2022

(51) Int. Cl.
| | | |
|---|---|---|
| G06Q 30/02 | (2012.01) | |
| G06F 16/23 | (2019.01) | |
| H04L 51/04 | (2022.01) | |
| H04L 67/306 | (2022.01) | |
| H04L 51/214 | (2022.01) | |
| H04L 67/50 | (2022.01) | |

(52) U.S. Cl.
CPC ..... G06Q 30/0254 (2013.01); G06F 16/2379 (2019.01); G06Q 30/0204 (2013.01); G06Q 30/0269 (2013.01); G06Q 30/0272 (2013.01); H04L 51/04 (2013.01); H04L 51/214 (2022.05); H04L 67/306 (2013.01); H04L 67/535 (2022.05); *G06Q 30/0242* (2013.01); *G06Q 30/0267* (2013.01)

(58) Field of Classification Search
USPC ................................. 705/14.1, 7.33
See application file for complete search history.

(56) References Cited

U.S. PATENT DOCUMENTS

| | | | |
|---|---|---|---|
| 11,352,008 B2* | 6/2022 | Sandoval Leon | B60W 10/02 |
| 2011/0295667 A1* | 12/2011 | Butler | G06Q 30/0255 705/14.12 |
| 2014/0180788 A1* | 6/2014 | George | G06Q 50/01 705/14.72 |

(Continued)

OTHER PUBLICATIONS

Adaptive_Modeling_for_Real_Time_Analytics_The_Case_of_Big_Data_in_Mobile_Advertising (Year: 2015).*

(Continued)

*Primary Examiner* — Gautam Ubale
(74) *Attorney, Agent, or Firm* — Fish IP Law, LLP

(57) ABSTRACT

A marketing campaign management system that includes a campaign platform that categorizes intended recipient profiles corresponding to intended recipients of marketing campaign messages based on their levels of fatigue. Recipient profiles categorized as "saturated" are then sub-segmented to determine their relative levels of fatigue or saturation. The intended recipient profiles that are most fatigued are removed from a recipients list such that they will not be sent any campaigns until after a rest state has been completed. A transitional safe state ensures that the intended recipient profiles inserted back into the list are not immediately removed once again.

12 Claims, 6 Drawing Sheets

(56) References Cited

U.S. PATENT DOCUMENTS

| | | | |
|---|---|---|---|
| 2014/0273978 A1* | 9/2014 | Van Snellenberg | H04W 4/00 |
| | | | 455/412.2 |
| 2018/0167473 A1* | 6/2018 | Gierada | H04L 67/535 |
| 2018/0219819 A1* | 8/2018 | O'Brien | G06Q 30/0277 |
| 2020/0065857 A1* | 2/2020 | Lagi | G06Q 30/0269 |

OTHER PUBLICATIONS

Developing an index for measuring the engagement of internet media (Year: 2008).*

* cited by examiner

NETWORK MANAGEMENT BASED ON MARKETING MESSAGE FATIGUE

FIELD OF THE INVENTION

The field of the invention is marketing campaign distribution management technologies.

BACKGROUND

The background description includes information that may be useful in understanding the present invention. It is not an admission that any of the information provided herein is prior art or relevant to the presently claimed invention, or that any publication specifically or implicitly referenced is prior art.

In the pursuit of capturing consumer's attention, marketers reach out to their audience via different channels. Marketers commonly connect with recipients via one or more of emails, text messaging, social media advertisements, and website advertisements, among other channels.

This inefficient, "scattershot" approach contributes to network congestion as every marketer has to reach out to all of their potential customers over as many channels as possible to ensure the greatest possible audience.

Moreover, since there is no coherence in the cross-channel messaging, and the cadence at which these messages are sent is too frequent, it can lead to steep decrease in response rates.

When many individuals begin to feel overwhelmed or they frequently see messages from brand, it causes fatigue which can lead to some serious issues, such as:
1. Recipients skipping over messages or deleting them;
2. Increase in spam complaints;
3. Lower response rates with clicks and conversions being lower;
4. High unsubscribe rates; and
5. Negative sentiment towards the brand Others have attempted to manage marketing campaign performance. For example, marketers monitor their marketing channels for "unsubscribe" rates on a periodic basis (e.g., month over month). Increases in unsubscribe rates can be indicative of recipient fatigue and alludes to a high churn rate. However, the approach is passive and only diagnoses a problem after the damage has already occurred. Additionally, computing and networking resources are wasted marketing to already-fatigued recipients until the moment the recipient unsubscribes.

Thus, there is still a need for marketing campaign systems that maximize audience engagement while optimizing the computing and network resources it consumes.

SUMMARY OF THE INVENTION

The inventive subject matter provides apparatus, systems and methods in which a campaign platform includes a database with intended recipient profiles corresponding to a plurality of intended recipients of marketing campaigns and a list of the intended recipients.

The campaign platform monitors the campaigns that are sent to each intended recipient and the intended recipients' engagement with the campaigns, and determines a frequency value from the number of times a particular recipient was sent campaigns and a recency value based on the elapsed time since the recipient opened a campaign message that the recipient received.

From these values, the campaign platform determines a fatigue status for the intended recipient profile. The fatigue status can be one of undersaturated, unsaturated or saturated.

For each of the intended recipient profiles having an undersaturated or unsaturated fatigue status, the campaign platform continues sending campaigns normally and continues to monitor the intended recipient to periodically determine the frequency value and recency value.

In preferred embodiments, the campaign platform executes a sub-segmentation process on the intended recipient profiles having a saturated status. As a result of the sub-segmentation process, the campaign platform organizes the saturated intended recipient profiles into a least from most fatigued to least fatigued.

In these embodiments, the campaign platform then takes a plurality of the most-fatigued intended recipient profiles and sets their state attribute to "rest state". The campaign platform also removes each of the intended recipients whose profiles are in the rest state from the intended recipients list.

Each of the most-fatigued intended recipient profiles are kept in the rest state for a predetermined amount of days. These intended recipients are not sent any campaigns while their profiles are in the rest state.

Upon the expiration of the predetermined period of time in the rest state, the campaign platform changes the state attribute of the intended recipient profile to "safe state." An intended recipient profile remains in the safe state during a predetermined period of time. The period of time spent in the safe state can be the same or different than the period of time spent in the rest state.

When an intended recipient profile is moved to the safe state, the campaign platform adds the intended recipient corresponding to the profile back into the intended recipients list. Thus, this intended recipient is once again sent campaigns normally. However, while in the safe state, the campaign platform does not make any adjustments to the fatigue status attribute of the intended recipient profile.

At the end of the safe state period, the campaign platform evaluates the intended recipient profile to determine whether the intended recipient is still "send-fatigued" (i.e., meets the criteria to have the fatigue status remain at "saturated") based on the campaigns sent to the intended recipient during the safe state period and the interactions of the recipient with those campaigns received.

If the campaign platform determines the intended recipient is no longer meeting the thresholds to remain at the saturated status, the campaign platform transitions the state attribute to "normal" and changes the fatigue status to "unsaturated" or "undersaturated", depending on the results of the evaluation. At this point, the intended recipient will receive campaigns normally and the campaign platform will continue with the normal, periodic evaluation to determine a fatigue status.

If the campaign platform determines that the intended recipient's fatigue status remains at "saturated", it transitions the state attribute back to "rest state" for a new period of time, as the intended recipient is considered to have "relapsed." The new period of time at the rest state after a relapse can increase after each relapse so that the intended recipient has a longer amount of time to "recover" after each relapse.

The systems and methods of the inventive subject matter improve upon prior marketing campaign platform technologies by quickly and effectively transitioning intended recipients to and from the intended recipients list, thus reducing wasteful use of networking and computational resources required to distribute marketing campaign recipients.

For systems with large amounts of recipients, the systems and methods of the inventive subject matter also allow for the management of a larger total amount of intended recipients without requiring a corresponding increase in computational or networking resources. In systems with large amounts of possible recipients, it is unlikely that all of the recipients will be either unsaturated or undersaturated at the same time. This allows for the systems and methods of the inventive subject matter to add additional recipients to the system to take advantage of the system resources saved while other intended recipients are off of the recipients list during "quarantine".

Various objects, features, aspects and advantages of the inventive subject matter will become more apparent from the following detailed description of preferred embodiments, along with the accompanying drawing figures in which like numerals represent like components.

All publications identified herein are incorporated by reference to the same extent as if each individual publication or patent application were specifically and individually indicated to be incorporated by reference. Where a definition or use of a term in an incorporated reference is inconsistent or contrary to the definition of that term provided herein, the definition of that term provided herein applies and the definition of that term in the reference does not apply.

This description includes information that may be useful in understanding the present invention. It is not an admission that any of the information provided herein is prior art or relevant to the presently claimed invention, or that any publication specifically or implicitly referenced is prior art.

In some embodiments, the numbers expressing quantities of ingredients, properties such as concentration, reaction conditions, and so forth, used to describe and claim certain embodiments of the invention are to be understood as being modified in some instances by the term "about." Accordingly, in some embodiments, the numerical parameters set forth in the written description and attached claims are approximations that can vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the invention are approximations, the numerical values set forth in the specific examples are reported as precisely as practicable. The numerical values presented in some embodiments of the invention may contain certain errors necessarily resulting from the standard deviation found in their respective testing measurements.

Unless the context dictates the contrary, all ranges set forth herein should be interpreted as being inclusive of their endpoints and open-ended ranges should be interpreted to include only commercially practical values. Similarly, all lists of values should be considered as inclusive of intermediate values unless the context indicates the contrary.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all Markush groups used in the appended claims.

DETAILED DESCRIPTION

Throughout the following discussion, numerous references will be made regarding servers, services, interfaces, engines, modules, clients, peers, portals, platforms, or other systems formed from computing devices. It should be appreciated that the use of such terms, is deemed to represent one or more computing devices having at least one processor (e.g., ASIC, FPGA, DSP, x86, ARM, ColdFire, GPU, multi-core processors, etc.) programmed to execute software instructions stored on a computer readable tangible, non-transitory medium (e.g., hard drive, solid state drive, RAM, flash, ROM, etc.). For example, a server can include one or more computers operating as a web server, database server, or other type of computer server in a manner to fulfill described roles, responsibilities, or functions. One should further appreciate the disclosed computer-based algorithms, processes, methods, or other types of instruction sets can be embodied as a computer program product comprising a non-transitory, tangible computer readable media storing the instructions that cause a processor to execute the disclosed steps. The various servers, systems, databases, or interfaces can exchange data using standardized protocols or algorithms, possibly based on HTTP, HTTPS, AES, public-private key exchanges, web service APIs, known financial transaction protocols, or other electronic information exchanging methods. Data exchanges can be conducted over a packet-switched network, the Internet, LAN, WAN, VPN, or other type of packet switched network.

The following discussion provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

Figure 1:
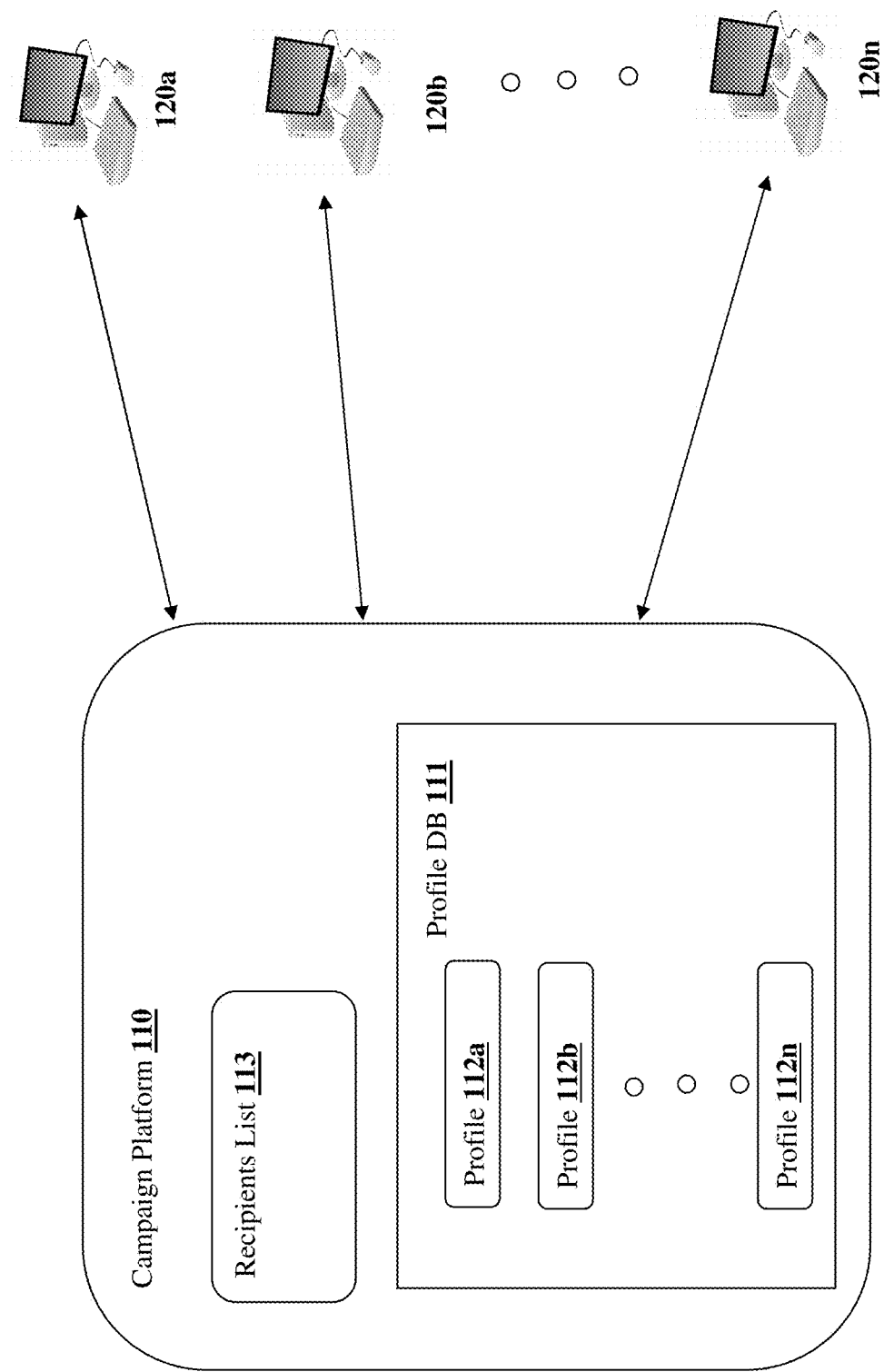
FIG. 1 is a diagrammatic overview of the system according to embodiments of the inventive subject matter.

FIG. 1 shows a diagrammatic overview of a system 100 according to embodiments of the inventive subject matter.

As seen in FIG. 1, the system 100 includes a campaign platform 110 capable of communicating with a plurality of recipient computing devices 120. The campaign platform 110 and computing devices 120a-n can communicate using any suitable methods of data exchange known in the art. Examples of suitable methods of data exchange include via the Internet, cellular communication, near-field communication ("NFC"), Bluetooth, etc.

The campaign platform 110 can comprise one or more computing devices, collectively having one or more processors that execute the various functions associated with the inventive subject matter. Suitable computing devices for campaign platform 110 can include server computers, laptop computers, desktop computers, tablets, smartphones, etc. In embodiments, the campaign platform 110 can be hosted on a cloud-based computing platform.

The recipient computing devices 120 can each comprise one or more computing devices that allow the recipient to receive and interact with marketing campaigns sent by the campaign platform 110. Suitable computing devices for recipient computing devices 120 can include server computers, laptop computers, desktop computers, tablets, smartphones, gaming consoles, etc. As discussed herein, references to the intended recipient 120 are understood to refer to the computing devices as accessed by the recipients for the purposes of the functions and processes of the inventive subject matter.

The campaign platform 110 includes a profile database 111 that stores a plurality of intended recipient profiles 112a-n. Each intended recipient profile 112 corresponds to an intended recipient 120 (reached via a respective computing device 120), to which the operator of campaign platform 110 can send marketing campaign messages. An intended recipient profile 112 includes a fatigue status attribute that is representative of the current fatigue status of the intended recipient. The fatigue status attribute can be one of "under-saturated", "unsaturated", and "saturated," reflecting the fatigue status of the intended recipient 120 corresponding to the respective intended recipient profile 112. The modification of the fatigue status attribute and handling of an intended recipient profile 112 based on the fatigue status attribute is discussed further in detail below. When a new intended recipient profile 112 is added to the profile database 111, the initial fatigue status is "under-saturated" because no campaigns have been sent to that respective recipient.

The intended recipient profile 112 also includes a state attribute. The state attribute can be one of "normal", "rest" and "safe." The changes between the states will be discussed in greater detail below.

In embodiments, the intended recipient profile 112 can include information related to the campaigns sent to the corresponding recipient 120, such as a counter of campaigns sent over a recent window of time, a counter of campaigns sent overall, a counter of the time elapsed since the most recent opened/engaged-with campaign, a counter of the number of campaigns opened/engaged-with in a recent sliding window of time, a number of total opened/interacted-with campaigns overall, a number of unsubscribes, etc.

The intended recipient profile 112 can optionally include additional information about the corresponding intended recipient 120 such as an identifier (e.g., name), an electronic address used to send the campaigns (e.g., email address, cell phone number, etc.), an indicator of the channel(s) used to send campaigns to the recipient, etc.

The campaign platform 110 also includes a list of recipients 113. The list of recipients 113 is a list of the intended recipients 120 that are to receive campaign messages from the campaign platform 110. As will be discussed in greater detail below, the list of recipients 113 can be modified by the campaign platform 110 to add or remove recipients from the list. As such, the list of recipients 113 does not necessarily include every single intended recipient 120 at all times.

It should be noted that in the embodiments discussed herein, the campaign platform 110 is described as sending the campaigns to the recipients. However, it is contemplated that in other embodiments a separate computing platform can be responsible for actually sending campaigns. In these other embodiments, the campaign platform 110 is in communication with the separate computing platform and performs the functions discussed herein to manage the list of recipients such that the separate computing platform only sends the messages to the appropriate recipients.

As used herein, "campaign" or "marketing campaign" refers to an advertising or marketing message that is sent to recipients. Thus, when reference is made to a recipient receiving or opening "a campaign", this refers to a single instance of a message or communication sent by the marketing platform to the recipient.

The processes executed by the campaign platform 110 of the inventive subject matter can be considered to have three principal stages: fatigue segmentation, sub-segmentation, and the filtering state machine. An overview of these stages as a part of the overall process is shown in FIG. 2.

Figure 2:
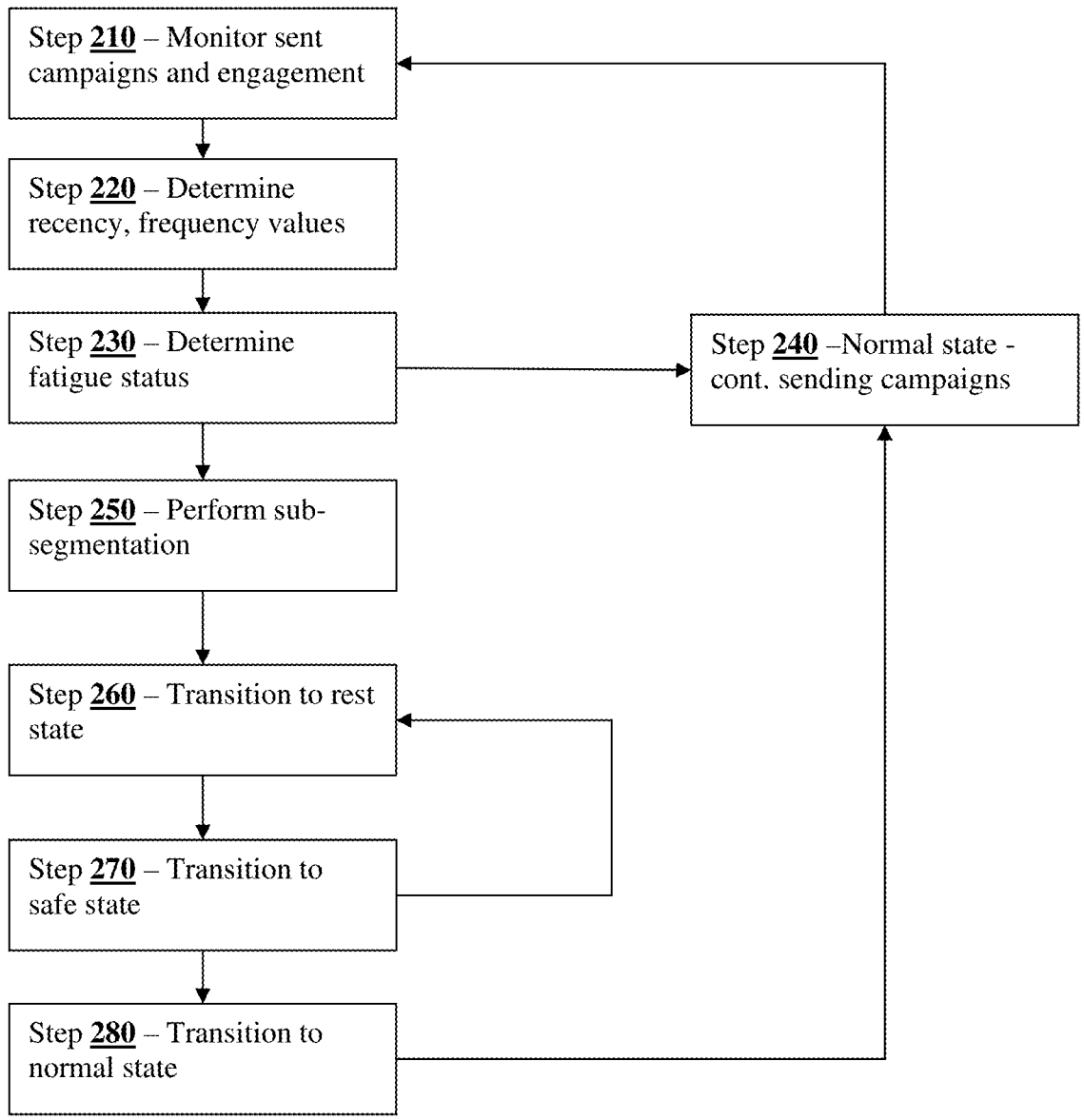
FIG. 2 provides a flowchart of processes executed by the campaign platform, according to embodiments of the inventive subject matter.

Steps 210-230 of FIG. 2 can be considered to correspond to the fatigue segmentation process by the campaign platform 110, according to embodiments of the inventive subject matter.

In order to properly classify the status of each of the intended recipients, the campaign platform 110 monitors the distribution of campaigns to the various intended recipients 120 included in recipient list 113 and their interactions with the campaigns at step 210.

For each of the intended recipients 120, the campaign platform 110 continually monitors the campaigns that have been sent and which campaigns have been interacted with by the intended recipient 120 to determine engagement. The specific interaction monitored by the campaign platform 110 can depend on the specific channel of communication used to communicate the campaign.

For example, for an email campaign, the interaction that is monitored is whether the email campaign was opened by the recipient. To do this, a read receipt or other indication of the email being opened is transmitted by the recipient email system back to the campaign platform 110. For an MMS or text message campaign, a measured interaction for the purposes of engagement can comprise a read indication can be sent back to the campaign platform 110 or a click of a link in the message. For a social media campaign, a measured interaction can comprise an indication that the user has scrolled past the campaign or that the user has clicked on the campaign. For a campaign on a video hosting platform (e.g., a video advertisement), a measured interaction can comprise an indication that the user has viewed a certain percentage of the video. Other forms of tracking advertisement engagement are known in the art and can be applied by the campaign platform 110 to determine a recipient's engagement with a particular marketing campaign.

For the purposes of the illustrative example of the embodiments described herein, the marketing campaign is an email campaign and interaction monitored by the campaign platform 110 is whether the intended recipient has opened the campaign email. Upon opening the email, an indication of the opening (e.g., a "read receipt") is transmitted back to the campaign platform 110.

For each of the intended recipients, the campaign platform 110 computes a recency value and a frequency value at step 220.

The campaign platform 110 determines a recency value for an intended recipient 120 by tracking the number of days since the intended recipient 120 opened a campaign that was sent to it.

For the frequency value, the campaign platform 110 counts the number of times that an intended recipient 120 has opened campaigns (either the same campaign or different campaigns) in a pre-determined period of observation. The period of observation can be the previous 60 days, previous 30 days, previous 2 weeks, or other pre-determined period of time.

For each of the intended recipients 120a-120n, the campaign platform 110 then determines a fatigue status based on the determined recency value and the frequency value at step 230. The status can be one of under-saturated, unsaturated, or saturated as follows:

If an intended recipient 120 has not been sent any campaigns at all, then the campaign platform 110 sets the fatigue status attribute for the intended recipient profile 112 to "under-saturated."

If an intended recipient 120 has not been sent any campaigns within a pre-determined period of observation (e.g., in the last month, last two months, etc.) nor has opened any campaigns in a preceding predetermined time frame (e.g., the last month), the campaign platform 110 sets the fatigue status attribute for the intended recipient profile 112 to "under-saturated." It should be noted that this predetermined time frame does not necessarily have to be the same length as the period of observation.

If an intended recipient 120 has been sent campaigns within the period of observation but those campaigns were never opened during the predetermined time frame, the campaign platform 110 sets the fatigue status attribute for the intended recipient profile 112 to "saturated."

If an intended recipient 120 has opened campaigns within the period of observation but where the system has detected a decrease in engagement for a consecutive period of time (e.g., over a certain number of consecutive days), the campaign platform 110 sets the fatigue status attribute for the intended recipient profile 112 to "saturated."

The engagement for an intended recipient 120 is a response rate that is determined by the campaign platform 110 based on the responses received from the recipient 120. The response rate is determined by dividing the number of responses received by the campaign platform 110 over a pre-determined period of time (e.g., a week, each day over the course of a week, etc.) by the number of sent campaigns to the recipient 120 over the same pre-determined period of time (e.g., that same week, each day over the course of that week, etc.).

The campaign platform 110 measures a decrease in engagement by determining a decrease in engagement (e.g., a certain percentage lower than an average response rate; a downward-trending response rate over a certain decrease threshold, etc.) over consecutive periods of time.

If an intended recipient 120 has opened a campaign within the preceding period of observation and the system has not detected a decreased engagement over a measured consecutive period of time (e.g., the certain number of consecutive days), then the campaign platform 110 sets the fatigue status attribute of the intended recipient profile 112 to "unsaturated." The unsaturated status is what could be considered the "just right" status for a particular intended recipient 120.

In certain situations, there is not enough information for an intended recipient 120 for the campaign platform 110 to determine the status according to one of the above situations. In these instances, the campaign platform 110 sets the fatigue status attribute for the intended recipient profile 112 to "under-saturated."

A state is a logical concept that describes the different ways that the system treats each intended recipient. Based on the intended recipients' respective states, the campaign platform 110 is able to distinguish how/which campaigns are sent to the various intended recipients 120a-n and how each of the intended recipients 120a-n is treated based on their individual engagement rates. In the embodiments of the inventive subject matter discussed herein, an intended recipient 120 can have one of three different states: normal, rest, or safe. This state is reflected by the state attribute of the intended recipient profile 112.

To determine how send-fatigued recipients will be temporarily isolated so as to reduce their saturation/fatigue level, the systems and methods of the inventive subject matter employs a filtering state machine. There are two principal aspects to the filtering state machine: the state of an intended recipient and transitions between states.

For each intended recipient profile 112 that is determined to be "unsaturated" or "undersaturated", the campaign platform 110 sets the state attribute of the intended recipient profile 112 as "normal" at step 240. The intended recipient profiles 112 in a "normal" state are kept in the intended recipients list 113. As such, campaign messages are sent regularly intended recipient profiles 112 in a "normal" state and the campaign platform 110 continues to perform the monitoring and fatigue-segmentation for these profiles 112. Thus, the process returns to step 210.

For each intended recipient profile 112 that has been designated with the fatigue status of "saturated", the campaign platform 110 proceeds to perform a further sub-segmentation at step 250. As will be described in further detail below, the sub-segmentation will result in a sorted list of saturated intended recipient profiles 112, divided into sub-segments. Each sub-segment denotes a degree of fatigue suffered by the intended recipient 120 based on the number of campaigns sent to the recipient. The highest-ranked saturated profiles in the top sub-segment(s) are considered to be "send-fatigued."

To properly assign a saturated recipient to a correct sub-segment, the campaign platform 110 calculates a fatigue score based on (1) a degree of reduction in the engagement rate of the recipient, (2) the degree of increase in the number of sends delivered to the recipient, and (3) the degree to which send volume has caused their reduction in engagement. The fatigue score is a sorting of these three variables, sorting on these three and partitioning the sorted list to form the sub-segments.

For a pre-determined number of the top (i.e., most send-fatigued) sub-segments, the campaign platform 110 proceeds to execute the filtering state machine at step 260 to "remove" them out of circulation by transitioning them into a "rest" state (setting their state attribute to "rest") and removing these intended recipients from the recipients list 113 for a predetermined duration of time. The duration of the rest state can be set or modified by an operator. (e.g., 7 days)

The rest state is the state for the intended recipient profiles 112 that have been isolated as a result of the campaign platform 110 executing the sub-segmentation process discussed above. Thus, the saturated, "send-fatigued" intended recipient profiles 112 that are in "time-out" for the predetermined period of time.

While an intended recipient profile 112 is in the rest state, no campaign messages are sent to the corresponding intended recipient 120 and the fatigue segmentation process is not executed for the "resting" intended recipient profile 112.

After the predetermined duration of time in the rest state expires, the campaign platform 110 transitions the intended recipient profile 112 from the rest state to the safe state at step 270 by setting its state attribute to "safe".

The safe state corresponds to a state for the intended recipients 120 that follows the rest state. Intended recipients in the safe state are tested to determine whether they are still send-fatigued. Intended recipients in the safe state are sent campaigns as if they were in the normal state, but the re-segmenting procedure is not applied to them and as such they would not be classified as "saturated". Intended recipient profiles are held in the safe state for a pre-determined amount of days that can be modified by an operator. (e.g., 3 days)

When an intended recipient profile 112 is transitioned from the rest state to the safe state at step 270, the campaign platform 110 adds the intended recipient 120 to the intended recipient list 113 so that the recipient 120 is able to receive campaigns once again.

While an intended recipient profile 112 is in the safe state, the campaign platform 110 measures the engagement of the intended recipient 120 with the campaigns sent during the safe state period. If the campaign platform 110 determines that the level of engagement is at a sufficiently high level at the end of the predetermined period of time in the safe state, it transitions the intended recipient profile 112 from the safe state to the normal state at step 280, after which the process returns to step 240. At step 280, the campaign platform 110 also changes the fatigue status attribute of the intended recipient profile 112 from "saturated" to either "unsaturated" or "undersaturated", depending on the measured engagement level of the intended recipient.

The campaign platform 110 determines whether a recipient 120 in the safe state may be moved back to the normal state based on a determination of the recency/frequency values. If there are recent responses to messages sent in the safe state up to a certain threshold, then such intended recipients 120 can be moved into the normal state. This threshold and recency/frequency is the same process used for determining whether a recipient should be saturated or unsaturated discussed herein. As discussed herein, if an intended recipient 120 falls in engagement (measured by the local mean of engagement divided by the global mean of engagement) for a certain number of days, they become saturated. However in this case, the campaign platform 110 is actually testing the opposite: if the particular intended recipient 120's local mean-global mean metric rises above the threshold, they can be moved back into the normal state because their engagement would be reflective of an unsaturated recipient.

It is contemplated that there maybe other metrics or criteria that the campaign platform 110 can use to determine the transition criteria from safe state to normal state. For example, another one can be such that the recipient engages to at least K number of messages in a timeframe T (K=1 and T=1 week may mean that they respond to a message within a week of sending it). Such criteria can be used, remaining consistent with the filtering state machine discussed herein.

If the campaign platform 110 determines that the level of engagement is not at a sufficiently high level, then it transitions the intended recipient profile 112 from the safe state back to the rest state, returning the process back to step 260. The fatigue status of the intended recipient profile 112 remains at "saturated."

In this situation, the intended recipient 120 is considered to have "relapsed." To reduce the chances of additional relapses, the time spent in the rest state after a relapse is increased.

Thus, as an intended recipient 120 relapses more often, they are "quarantined" in the rest state for a longer and longer period of time. In these embodiments, the increased periods spent in the rest state is based on the number of relapses. For example, the number of days that a relapsing recipient spends in the rest state after a relapse can be calculated by the function:

$f(n)=7+(n+1)^2$, where n is the number of relapses that the intended recipient has had.

Figure 3:
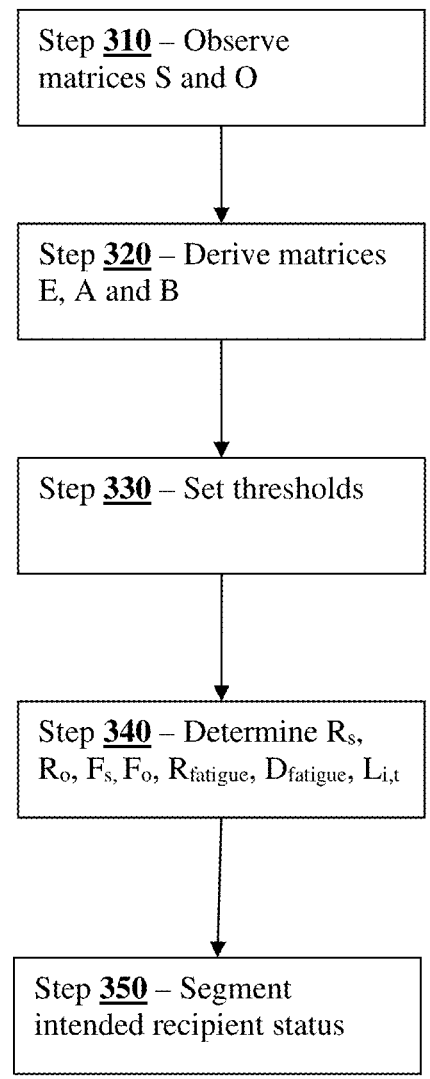
FIG. 3 provides a flowchart of the fatigue segmentation stage in detail, according to embodiments of the inventive subject matter.

Steps 210 through 230 of FIG. 2 can be considered to be the fatigue segmentation section of the process. FIG. 3 is a flow chart of the fatigue segmentation process in greater detail, according to embodiments of the inventive subject matter.

At step 310, the campaign platform observes two matrices: a send count matrix (S), and an open count matrix (O).

In the send count matrix (S), each row is an intended recipient "i" from the recipients 120, and each column is time period "t". The value of $S_{i,t}$ is the count of sends to the recipient "i" in the time "t".

In the open count matrix (O), each row is an intended recipient "i" from the recipients 120, and each column is time period "t". The value of $O_{i,t}$ is the open count (the amount of campaigns opened by the recipient) for recipient "i" at the time "t".

From these two matrices, the campaign platform 110 derives the following matrices at step 320: An open rate matrix (E), a send LGM matrix (A) and an open rate LGM matrix (B).

An open rate matrix (E): $E_{i,t}=O_{i,t}/S_{i,t}$

A send LGM matrix (A): $A_{i,t}$ is the local-global mean value of send counts to the recipient "i" at a time "t". In these embodiments of the inventive subject matter, this is a sliding window (local) average from $S_{i,t-3}$ to $S_{i,t}$, divided by the cumulative running (global) average from $S_{i,0}$ to $S_{i,t}$. Here, A=local_global_ mean(S)

An open rate LGM matrix (B): $B_{i,t}$ is the local-global mean value of the open rates of recipient "i" at time "t". In these embodiments of the inventive subject matter, this is a sliding window (local) average from $E_{i,t-3}$ to $E_{i,t}$ divided by the cumulative running (global) average from $E_{i,0}$ to $E_{i,t}$. To determine B, the campaign platform 110 determines the local-global mean for each time point t, for each recipient i. This is a smoothed moving average version of "E". Thus, B=local_global_mean(E).

At the conclusion of step 320, the campaign platform 110 has derived five vectors for each recipient "i": $S_{(i,.)}$, $O_{(i,.)}$, $E_{(i,.)}$, $B_{(i,.)}$.

At step 330, the campaign platform 110 sets the following thresholds: $T_{send}$, $T_{open}$, $T_{open\ rate\ LGM}$, and $T_{fatigue\ duration}$.

$T_{send}$ is the threshold for send recency. $T_{send}$ determines whether a recipient has been sent a campaign recently or not. It is a value between 1 and 180. For example, if $T_{send}$ is set to 30, then any recipient whose last campaign received was in the last 30 days or less is said to have been sent recently. Similarly, if a recipient has not been sent in the last 30 days, then they are old senders. Recall that the last send a recipient i acquired is determined by $R_s(i)$ (and recipient j will acquire the send recency $R_s$ (j), etc.) As such, if $R_s(i) < T_{send}$, then the recipient was sent recently. Otherwise, they are not sent recently. If they are not sent recently, the campaign platform immediately sets the fatigue status attribute for the respective intended recipient profile 112 as "saturated" without executing any additional logic.

$T_{open}$ is the threshold for open recency, which determines whether a recipient has opened a campaign recently or not. Similar to $T_{send}$, suppose $T_{open}$=14. A recipient 120 who has opened a campaign in the last 14 days will be a recent opener, which is an intermediate logic used by the fatigue segmentation algorithm to determine the persona of that recipient 120. If the recipient has not opened in 14 days, then they are "old" openers. Recall that $R_o(i)$ determines the number of days (recency) since the last open event of that recipient i. So if $R_o(i) < T_{open}$, then the recipient i opened recently. Otherwise, they did not open recently.

$T_{open}$ rate LGM is the threshold for open rate LGM.

$T_{fatigue\ duration}$ is the minimum number of consecutive $A_{i,t}$ values to be qualified as "fatigued."

These thresholds can be set a priori or as the process is being executed.

At step 340, the campaign platform 110 uses the vectors $S_{(i,.)}$, $O_{(i,.)}$, $E_{(i,.)}$, $A_{(i,.)}$, and $B_{(i,.)}$ derived at step 320 and computes, for each recipient "i":

Recency of sends, $R_s$, which is the number of days between the last campaign sent to the recipient "i" and the current time.

Recency of opens, $R_o$, which is the number of days between the last campaign opened by the recipient "i" and the current time.

Frequency of sends, $F_s$, which is the number of campaigns sent to recipient "i". This frequency is across the entire duration of sends for that intended recipient 120. In the embodiments discussed herein, it is considered to be 6 months of "sends". However, this period can be adjusted within the campaign platform 110 by a user.

Frequency of opens, $F_o$, which is the number of campaigns opened by the recipient "i". The frequency is also across the entire duration of sends for the intended recipient 120. In these embodiment, the default period is considered to be 6 months. However, this period is also adjustable by a user.

Recency of last fatigued engagement rate, $E_{i,k+p}$, which will also be referenced to herein as $R_{i,k+p}$, and simplified as $R_{fatigue}$.

$R_{fatigue}$ describes a vector of values for each intended recipient 120. Each value is the recency of fatigue, which is the number of days since the intended recipient 120 was last fatigued. Since fatigue is operationalized by the local mean-global mean metric, and that metric is recorded in the B matrix the fatigue of a recipient 120. $E_{i,k+p}$ is used because B is a function of E. Specifically, $E_{i,k+p}$ means that recipient i and times k to k+p. So between time=0, to time=T, the campaign platform 110 selects a window of time k, k+p. Thus, it should be understood that in this instance the notation $E_{i,k+p}$ represents a window of consecutive values of engagement from k to k+p and not a single instance.

To summarize, $E_{i,k+p}$ describes a window of time of recipient i from time k to time k+p, and this window of engagement values is converted to local mean-global mean values in B, which in turn is used to measure fatigue. That last fatigue event time point is taken by $R_{fatigue}$ to compute the number of days since the end of the window of time recipient i is fatigued (same window as k to k+p as described in the first sentence of this paragraph).

For simplicity, it can be considered that $R_{fatigue}$ is computed from B to be the number of days since B was last seen to be below some threshold, $T_{open}$ rate LGM. If the open rate LGM (local global mean) falls below this threshold, a recipient is considered to be "fatigued."

Length of fatigue sub-sequence, $D_{fatigue}$. $D_{fatigue}$ came from B. In summary, what we described in 00102 is taking the last day in which a recipient i was fatigued and computing the number of days between the last day in the database to that time. That was Rfatigue, and Dfatigue computes the number of days between the beginning of the last fatigue duration to the end of the last fatigue duration. This can be found from B. If this duration is at least longer than $T_{fatigue\_duration}$ and if $R_{fatigue(i)}$=0, then the recipient is considered saturated. In other words, if $D_{fatigue(i)}$>= $T_{fatigue\_duration}$ and if $R_{fatigue(i)}$=0, then the recipient i is saturated.

Last value of the send LGM, $L_{i,t}$. It is the last value of $A_{(i,.)}$ vector.

It is important to note that $A_{(i,.)}$ is a vector <local_global_mean(A, time=0 for recipient i), local_global_mean(A, time=1 for recipient i), local_global_mean(A, time=2 for recipient i), . . . , local_global_mean(A, time=T for recipient i)>. The last value, local_global_mean(time=T for recipient i), is equal to $L_i$, as it is the most recent and last day's local global mean for send counts. For example, if T is today, then it refers to the trend of send counts of that recipient 120 today. This is used to determine, for today, if a recipient has been sent more messages recently (more likely to be classified as send-fatigued in saturated sub-segmentation) or not sent many messages recently (can be any of the other segments).

$L_{i,t}$ describes the last send LGM from recipient i of matrix A. If A is a matrix where each recipient is a row, and in each row, the local-global mean values for each time point are described in each value of that row, then the last value across all rows represents L.

At step 350, the campaign platform 110 then segments the intended recipients 120 in the recipients list 113 into under-saturated, unsaturated, or saturated as follows:

A) If $F_s=0$, then the intended recipient 120 has not been sent any campaigns and campaign platform 110 sets the fatigue status attribute of the intended recipient profile 112 to "undersaturated."

B) If $R_s$ is greater than $T_{send}$ and $R_o$ is greater than $T_{open}$, the campaign platform 110 sets the status in the intended recipient profile 112 to "undersaturated." In this case, since a relatively large amount of time has passed since the recipient received any campaigns and since they have interacted with a campaign, there is insufficient recent data to determine a true level of fatigue. As such, this recipient should receive campaigns so as to be able to collect the necessary data.

C) If $R_o$ is greater than $T_{send}$, $R_s$ is less than or equal to $T_{send}$, and $D_{fatigue}$ is greater than or equal to $T_{fatigue}$ duration, then the campaign platform 110 sets the fatigue status attribute in the intended recipient profile 112 to "saturated." In this situation, the recipient has been sent campaigns but has not responded in a sufficiently long time period and as such is considered to be saturated (fatigued).

D) If $R_{fatigue}$ is greater than $T_{open}$ and $D_{fatigue}$ is greater than or equal to $T_{fatigue}$ duration, then there are two potential outcomes:

1) If $F_{open}=0$, then it indicates that the recipient has not opened a campaign in the recent past and they have not been recently "fatigued". In this situation, the campaign platform 110 sets the fatigue status attribute of the intended recipient profile 112 to "undersaturated."

2) If $F_{open}$ is greater than 0, it indicates that the recipient has responded to a campaign in the recent past but has not been deemed "fatigued" recently. In this situation, the campaign platform 110 sets the fatigue status attribute of the intended recipient profile 112 to "unsaturated."

E) If $R_{fatigue}$ is less than or equal to $T_{open}$ and $D_{fatigue}$ is greater or equal to $T_{fatigue}$ duration, then it is indicative of a decreased engagement by the recipient for consecutive measured periods of time, and has been "worn out" for too many consecutive time periods. As such, the campaign platform 110 sets the status of the intended recipient profile 112 to "saturated."

1) If the amounts of campaigns sent to an intended recipient 120 is relatively high and this high amount of campaigns sent causes the decreased engagement by the recipient, the campaign platform 110 will set the status of the intended recipient profile to "saturated." As will be explained in greater detail below, these intended recipients 120 are the most "saturated" and are considered to be "send-fatigued." The correlation between the high rate of campaigns sent and the decreased engagement will determined via a causality test executed by the campaign platform 110.

F) If $R_o$ is less than or equal to $T_{open}$ and $F_o=0$, it is an indication that the intended recipient 120 has engaged with a received campaign recently and is not saturated if none of the statements A-E above are true. In this case, the campaign platform 110 sets the status of the intended recipient profile 112 as "unsaturated."

G) If the intended recipient 120 does not meet any of the criteria A-F, it is indicative that the particular recipient has not yet been engaged enough through campaigns and the monitored data regarding the recipient (if any) has not yet been sufficient. In these situations, the campaign platform 110 sets the status of the intended recipient profile 112 as "undersaturated."

Figure 4:
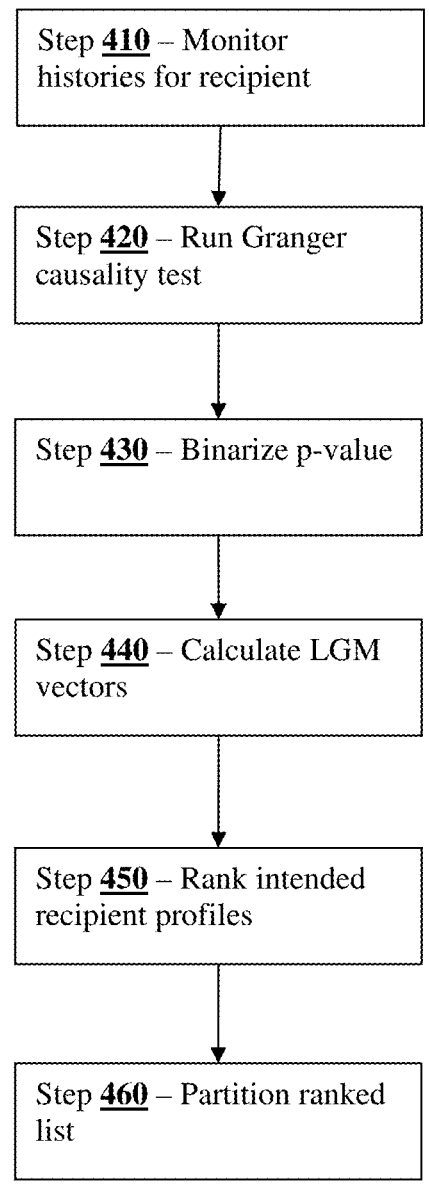
FIG. 4 provides a flowchart of the sub-segmentation stage in detail, according to embodiments of the inventive subject matter.

As discussed above with regard to FIG. 2, the campaign platform 110 The campaign platform 110 performs a sub-segmentation of the plurality of the intended recipient profiles 112 whose status has been set to "saturated" at step 250. FIG. 4 provides a flow chart of the sub-segmentation process of step 250 in greater detail.

At step 410, the campaign platform 110 monitors, for each saturated recipient, the engagement history (i.e., the vector of open rates) and the recipient's send history (i.e., the vector of send counts to that recipient). This corresponds to step 210 of FIG. 2, after which the process is executed as steps 220-230 in FIG. 2 and the detailed process of FIG. 3 to determine that a certain number of the intended recipients 120 in the list 113 are "saturated." Thus, the following steps of FIG. 4

At step 420, the campaign platform 110 runs a Granger causality test to determine whether the send count vector can cause the changes in the engagement rate vector. The Granger causality test outputs a p-value and $R^2$ score which determine the degree of causality and "explainability" of send counts to open rates, respectively.

The campaign platform 110 then binarizes the p-value to 1 (one) if the p-value is greater than 0.05, and to 0 (zero) otherwise at step 430. These 1 or 0 metrics are considered to be the "causality metric" for the system.

At step 440, the campaign platform 110 then computes a local-global mean vector for the send counts (the A matrix discussed above) and a local-global mean vector for the open rates (the B matrix discussed above). The A matrix is also referred to hereinafter as the "send LGM vector" (the vector "$LGM_{send}$") and the B matrix is also referred to hereinafter as the "open rate LGM vector" or "response LGM" (the vector "$LGM_{response}$").

Each LGM vector is calculated as follows:

$$LGM_{send}(t; w) = \frac{\text{local mean send count at time } t}{\text{global mean send count up to time } t}$$
$$= \frac{\text{the mean send counts across the last } w \text{ weeks (from week } (t-w) \text{ to } t}{\text{the mean send counts across the entire history (from } t = 0 \text{ to } t)}$$

$$LGM_{response}(t; w) = \frac{\text{local mean response rate at time } t}{\text{global mean response rate up to time } t}$$
$$= \frac{\text{the mean response rates across the last } w \text{ weeks (from week } (t-w) \text{ to } t}{\text{the mean open rate across the entire history (from } t = 0 \text{ to } t)}$$

The LGM of a particular time instance "t" for an intended recipient "i" represents a recent change in engagement by a recipient 120 compared to the longer-running overall engagement for that recipient. By dividing a sliding window average by the running (i.e., cumulative) average, the campaign platform 110 is able to capture recent changes in behavioral trends for a recipient 120 via the detected change in engagement of the recipient.

The LGMresponse (the B matrix above) reflects the change in response rate of a particular user. If it is relatively low, that means that the response rate decreased recently. If the response LGMresponse is relatively high, then it reflects an increase in the response rate for the particular recipient. As such, lower LGMresponse corresponds to greater fatigue, and high $LGM_{response}$ to less fatigue and more engagement. In the embodiments discussed herein, the LGM is considered to be low if the LGM is less than a threshold value (the $T_{open\_rate\_LGM}$). If the campaign platform 110 determines that B (the $LGM_{response}$) is less than $T_{open\_rate\_LGM}$, then the recipient 120 is considered to be fatigued. The campaign platform 110 tracks the consecutive number of values of B that are below this threshold. If the campaign platform 110 determines that the consecutive sequence is longer than $T_{fatigue\_duration}$ and it is recent, it will classify the intended recipient 120 as "saturated" by setting fatigue status attribute for the respective intended recipient profile 112 as "saturated".

If the $LGM_{response}$ is relatively high, then the recipient is considered to be increasing in response rate. This reflects that a recipient 120 is not fatigued/less likely to be fatigued. To determine if the LGM is relatively high, the campaign platform 110 determines whether the $LGM_{response}$ (again, the matrix B) is greater than or equal to the $T_{open\_rate\_LGM}$. If B is greater than or equal to $T_{open\_rate\_LGM}$, the recipient 120 is not considered to be fatigued.

For example, the threshold can be an LGMresponse value of one (meaning a ratio of ½ resulting from the equation above). If the LGMresponseless than one, then the localmean is is smaller than the global mean. This means that recently, the user has a lower response rate than usual, and is fatigued. In this case, the $LGM_{response}$ is considered to be "low." Conversely, if the numerator is higher than the denominator (i.e., a ratio greater than one), the local mean is higher than global mean. This means that the local response rate of a customer is higher than the usual response rate, so then they not considered to be fatigued by the campaign platform 110.

At step 450, the campaign platform 110 ranks first the causality metrics in descending order ("ones" first, then the "zeroes"), then the $R^2$ in descending order, then send LGM ($LGM_{send}$) vectors in descending order, and then the open rate LGM ($LGM_{response}$) vectors in descending order. The ranking of the intended recipients 120 reflects the degree of saturation of the intended recipients, starting at most saturated and descending from there. The fatigue score discussed above comprises a vector<$R^2$ (of causality), send LGM (from $L_i$), open rate LGM>for a given recipient and is not a scalar (one) value.

At step 460, the campaign platform 110 partitions the ranked list according to one or more pre-determined breakpoints. By default, a breakpoint is set such that the top of the ranked list has a smaller number of recipients than the bottom of the list. The breakpoints can be adjusted by a system user such as a marketer and additional breakpoints can be added such that there are more than two subsegments.

Figure 5:
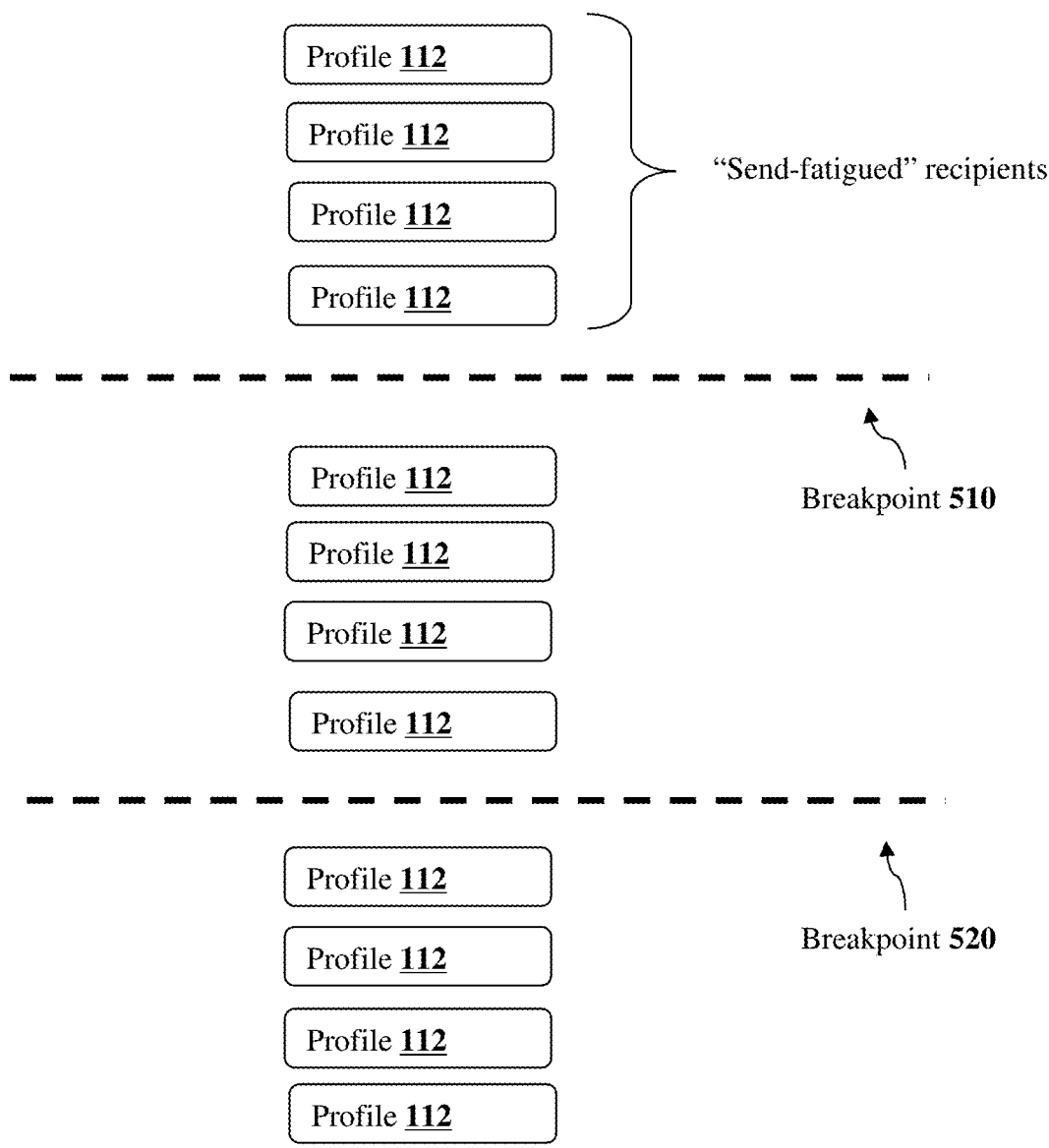
FIG. 5 provides an illustrative example of intended recipient profiles ranked, along with example breakpoints in the ranking list.

FIG. 5 illustrates a ranked list of intended recipient profiles 112 with the pre-determined breakpoints 510 and 520, illustrated by the broken lines.

The profiles 112 above the breakpoint 510 are considered to be the highest ranking (i.e., most fatigued) recipients, which are considered "send-fatigued". The campaign platform 110 then sets the state attribute of these profiles to "rest" and thus excludes this top sub-segment from campaign messaging for a period of time as part of the "rest and rejuvenation" stage, as discussed with regard to steps 260-280 of FIG. 2.

Figure 6:
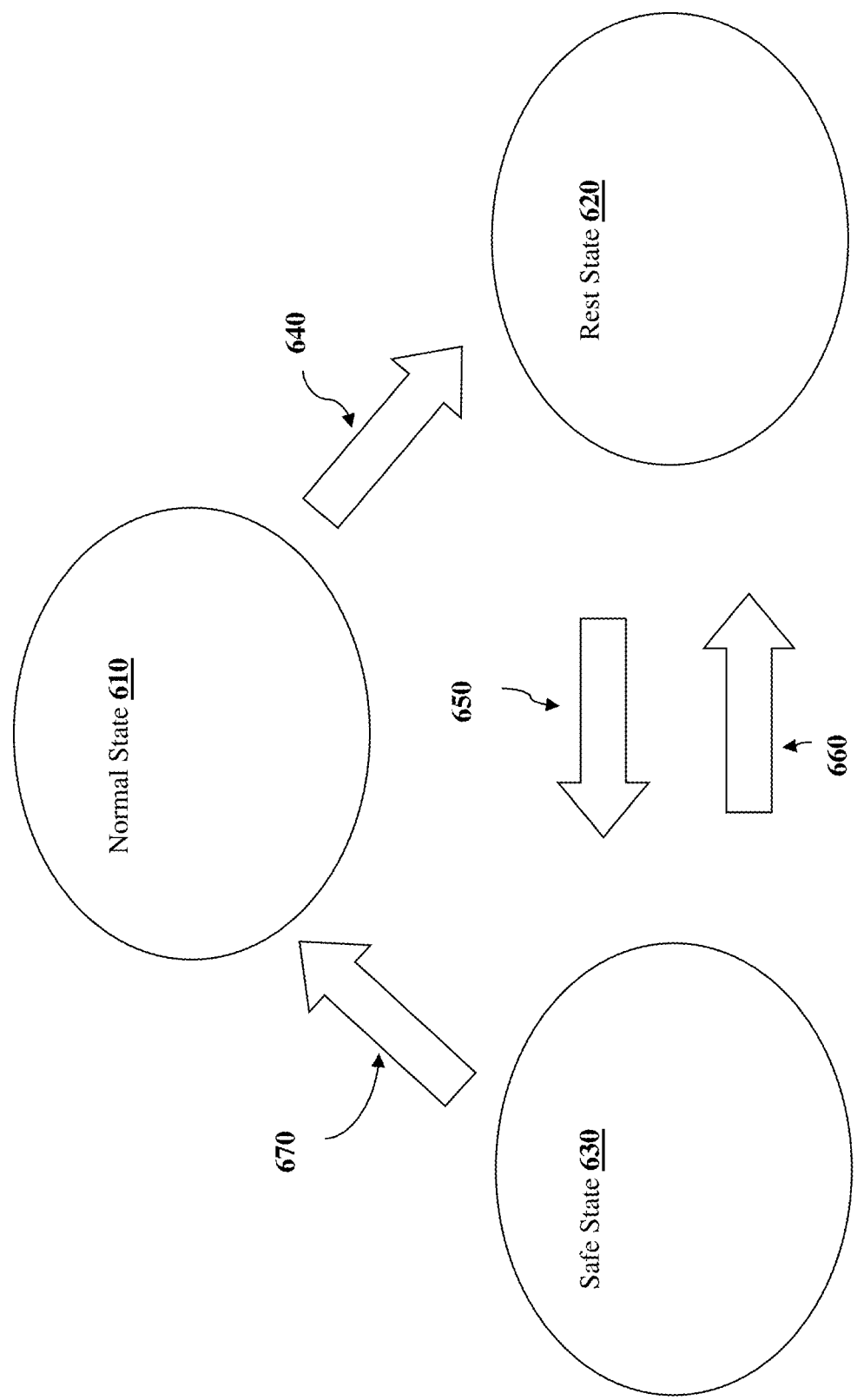
FIG. 6 illustrates the filtering state machine, including the transitions between states employed in embodiments of the inventive subject matter.

In managing the various possible states for an intended recipient, the system is programmed to carry out transitions between states. Not all states can change to all other states under all conditions. Instead, the transition rules govern how and when the campaign platform 110 is able to transition an intended recipient profile 112 between one state and another state. The various possible transitions are illustrated in FIG. 6, and are as follows:

From normal state 610 to rest state 620 (transition 640): This can be considered the "quarantining" transition that is discussed in detail above whereby send-fatigued intended recipient profiles 112 are placed into a rest state 620.

From rest state 620 to safe state 630 (transition 650): After a send-fatigued intended recipient has been in the rest state 620 for a pre-determined amount of days, the system transitions the intended recipient into the safe state 630.

From safe state 630 to rest state 620 (transition 660): If an intended recipient profile 112 is in the safe state 630 and still remains send-fatigued after a predetermined amount of days, then the intended recipient will be returned to the rest state 620 and remain in quarantine for a new quarantine period.

From the safe state 630 to a normal state 610 (transition 670): If an intended recipient profile 112 that is in the safe state 630 is determined by the campaign platform 110 to no longer be send-fatigued after a predetermined amount of days, then the intended recipient profile 112 is returned to the normal state 610.

It should be noted that in the systems and methods of the inventive subject matter it is not possible to transition directly from the normal state 610 to the safe state 630. If the intended recipient profile 112 transitions from the safe state 630 to the normal state 610, they will not directly go back to a safe state 630 if they have "relapsed" back into being send-fatigued. Instead, the system will transition this intended recipient profile 112 back into the rest state 620. In embodiments, the time that "relapsed" intended recipient profile 112 spend in the rest state 620 is increased as a function of the number of relapses.

Likewise, it should be noted that in the systems and methods of the inventive subject matter, it is not possible to transition directly from a rest state 620 to a normal state 610. An intended recipient profile 112 only transitions to a normal state 610 from a safe state 630. The safe state 630 functions as a vetting state to determine whether the intended recipient 120 associated with the intended recipient profile 112 remains send-fatigued. Without this intermediate vetting stage, a recently send-fatigued, isolated intended recipient profile 112 that was at rest would go back to normal and then immediately be segmented as over-fatigued and sent back to the rest state 620 without being able to "recover" from the send-fatigue.

In an alternative embodiment of the inventive subject matter, the recipients list 113 is global table of all of the intended recipients with each row corresponding to a recipient profile 112 and each column representing a different attribute within the profile. Thus, the fatigue status attribute and state attribute are each columns in the table. In these embodiments, the determination of the fatigue status attribute and state attributes, and the associated processes discussed above apply as well. However, in these embodiments the profiles 112 are not removed or added to the list based on the fatigue status attribute and state attribute. Instead, in these embodiments "removal" from the list 113 as discussed above is intended to mean that the campaign platform 110 simply skips sending campaigns to any profile 112 having a state attribute of "rest". Likewise, in these embodiments, re-inserting the profile 112 into the list 113 as discussed above is intended to mean that upon changing the state attribute from "rest" to either "normal" or "safe", the campaign platform 110 resumes sending campaigns to that recipient as well as applying the other processes associated with the inventive subject matter discussed above.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. At least one non-transitory computer readable storage medium storing instructions that, when executed by at least one processor, cause the at least one processor to:
for each of a plurality of intended recipient profiles included in a list of intended recipients, each of the intended recipient profiles corresponding to an intended recipient:
determine a frequency value for the intended recipient profile, wherein the frequency value comprises a number of times the intended recipient corresponding to the intended recipient profile has opened received campaign messages during a pre-defined preceding period of time;
determine a recency value for the intended recipient profile, wherein the recency value comprises an elapsed time since the intended recipient corresponding to the intended recipient profile has opened a campaign message from the received campaign messages; and
determine a fatigue status for the intended recipient profile based on the frequency value and recency value, wherein the fatigue status comprises one of: saturated, undersaturated, or unsaturated, wherein determining the fatigue status based on the frequency value and recency value further comprises:
if the intended recipient has not been sent any campaign messages during the pre-defined preceding period of time, set the fatigue status to undersaturated;
if the recency value indicates that the intended recipient has not opened any received campaign messages during the pre-defined preceding period of time, set the fatigue status to saturated;
determine whether there is a decreased level of engagement based on a percentage response rate over the pre-defined preceding period of time and at least one prior pre-defined period of time;
if there is a decreased level of engagement, set the fatigue status to saturated;
if there is not a decreased level of engagement, set the fatigue status to unsaturated;
remove at least one of the intended recipient profiles from the list of intended recipients based on a determined saturated fatigue status;
transmit a new campaign message to the intended recipient corresponding to each of the plurality of intended recipient profiles remaining on the list of intended recipients;
for each of the plurality of intended recipient profiles having a saturated fatigue status, maintain the removed intended recipient profile off the list of intended recipients for a first pre-determined period of time; and
in response to determining that the first pre-determined amount of time has elapsed, add the removed intended recipient profile to the list of intended recipients.

2. The at least one non-transitory computer-readable storage medium of claim 1, wherein the first predetermined period of time is determined as a function of a number of times that the removed intended recipient profile has been removed from the list of intended recipients.

3. The at least one non-transitory computer-readable storage medium of claim 1, further comprising instructions that cause the at least one processor to:
transition the removed intended recipient profile to a safe state for a second pre-determined amount of time; and
while the removed intended recipient profile remains in the safe state:
monitor responses to subsequent campaign messages by the intended recipient corresponding to the removed intended recipient profile; and
exclude the removed intended recipient profile from determining the frequency value and the recency value.

4. The at least one non-transitory computer-readable storage medium of claim 3, further comprising instructions that cause the at least one processor to, upon expiration of the second pre-determined about of time:
transition the removed intended recipient profile from the safe state to a normal state based on the monitored responses; and
in response to transitioning the removed intended recipient profile to the normal state, continuing to determine the frequency value and the recency value for the removed intended recipient profile.

5. The at least one non-transitory computer-readable storage medium of claim 1, further comprising instructions that cause the at least one processor to, for each of the plurality of intended recipient profiles remaining on the list of intended recipients:
continue to determine the frequency value;
continue to determine the recency value; and
determine an updated fatigue status based on the frequency and recency, wherein the updated fatigue status comprises one of saturated, undersaturated, or unsaturated.

6. The at least one non-transitory computer-readable storage medium of claim 1, wherein the instructions to remove the at least one of the intended recipient profiles from the list of intended recipients based on the saturated fatigue status further comprises instructions that cause the at least one processor to:
determine that each of subset of the plurality of intended recipient profiles has a saturated fatigue status based on the respective frequency value and recency value;
calculate a fatigue score for each of the subset of the plurality of intended recipient profiles;
rank the subset of the plurality of intended recipient profiles based on the fatigue scores from highest to lowest;
segment the ranked subset according to at least one breakpoint into a plurality of sub-segments, wherein a top-ranked sub-segment includes at least intended recipient profile having the highest fatigue score; and
remove the at least one of the intended recipient profiles from the top-ranked sub-segment from the list of intended recipients.

7. A method for reducing online campaign traffic based on user saturation, the method comprising:

for each of a plurality of intended recipient profiles included in a list of intended recipients, each of the intended recipient profiles corresponding to an intended recipient:

determining, by at least one processor, a frequency value for the intended recipient profile, wherein the frequency value comprises a number of times the intended recipient corresponding to the intended recipient profile has opened received campaign messages during a pre-defined preceding period of time;

determining, by the at least one processor, a recency value for the intended recipient profile, wherein the recency value comprises an elapsed time since the intended recipient corresponding to the intended recipient profile has opened a campaign message from the received campaign messages; and determining, by the at least one processor, a fatigue status for the intended recipient profile based on the frequency value and recency value, wherein the fatigue status comprises one of saturated, undersaturated, or unsaturated, wherein determining the fatigue status based on the frequency value and recency value further comprises:

if the intended recipient has not been sent any campaign messages during the pre-defined preceding period of time, setting the fatigue status to undersaturated;

if the recency value indicates that the intended recipient has not opened any received campaign messages during the pre-defined preceding period of time, setting the fatigue status to saturated;

determining, by the at least one processor, whether there is a decreased level of engagement based on a percentage response rate over the pre-defined preceding period of time and at least one prior pre-defined period of time;

if there is a decreased level of engagement, setting the fatigue status to saturated;

if there is not a decreased level of engagement, setting the fatigue status to unsaturated;

removing, by the at least one processor, at least one of the intended recipient profiles from the list of intended recipients based on a determined saturated fatigue status; and transmitting, by the at least one processor, a new campaign message to the intended recipient corresponding to each of the plurality of intended recipient profiles remaining on the list of intended recipients;

maintaining, by the at least one processor and for each of the plurality of intended recipient profiles having an saturated fatigue status, the removed intended recipient profile off the list of intended recipients for a first pre-determined period of time; and in response to determining that the first pre-determined amount of time has elapsed, adding, by the at least one processor, the removed intended recipient profile to the list of intended recipients.

8. The method of claim 7, wherein the first predetermined period of time is determined as a function of a number of times that the removed intended recipient profile has been removed from the list of intended recipients.

9. The method of claim 7, further comprising:

transitioning, by the at least one processor, the removed intended recipient profile to a safe state for a second pre-determined amount of time; and while the removed intended recipient profile is in the safe state:

monitoring, by the at least one processor, responses to subsequent campaign messages by the intended recipient corresponding to the removed intended recipient profile; and excluding, by the at least one processor, the removed intended recipient profile from determining the frequency value and the recency value.

10. The method of claim 9, further comprising, upon expiration of the second pre-determined about of time:

transitioning, by the at least one processor, the removed intended recipient profile from the safe state to a normal state based on the monitored responses; and continuing, by the at least one processor and in response to transitioning the removed intended recipient profile to the normal state, to determine the frequency value and the recency value for the removed intended recipient profile.

11. The method of claim 7, further comprising:

for each of the plurality of intended recipient profiles remaining on the list of intended recipients:

continuing, by the at least one processor, to determine the frequency value;

continuing, by the at least one processor, to determine the recency value; and determining, by the at least one processor, an updated fatigue status based on the frequency and recency, wherein the updated fatigue status comprises one of saturated, undersaturated, or unsaturated.

12. The method of claim 7, wherein the step of removing further comprises:

determining, by the at least one processor, that each of subset of the plurality of intended recipient profiles has a saturated fatigue status based on the respective frequency value and recency value;

calculating, by the at least one processor, a fatigue score for each of the subset of the plurality of intended recipient profiles;

ranking, by the at least one processor, the subset of the plurality of intended recipient profiles based on the fatigue scores from highest to lowest;

segmenting, by the at least one processor, the ranked subset according to at least one breakpoint into a plurality of sub-segments, wherein a top-ranked sub-segment includes at least intended recipient profile having the highest fatigue score; and removing, by the at least one processor, the at least one of the intended recipient profiles from the top-ranked sub-segment from the list of intended recipients.

* * * * *

UNITED STATES PATENT AND TRADEMARK OFFICE
CERTIFICATE OF CORRECTION

PATENT NO. : 11,488,204 B2
APPLICATION NO. : 16/934938
DATED : November 1, 2022
INVENTOR(S) : Pisupati et al.

It is certified that error appears in the above-identified patent and that said Letters Patent is hereby corrected as shown below:

In the Specification

In Column 1, Line 39, delete "brand" and insert -- brand. --, therefor.

In Column 10, Lines 35-41, delete "Thus, as an intended recipient 120 relapses more often, they are "quarantined" in the rest state for a longer and longer period of time. In these embodiments, the increased periods spent in the rest state is based on the number of relapses. For example, the number of days that a relapsing recipient spends in the rest state after a relapse can be calculated by the function:" and insert the same on Column 10, Line 34 (Approx.), as a continuation of the same paragraph, therefor.

In Column 11, Line 33, delete "local_global_ mean(S)" and insert -- local_global_mean(S) --, therefor.

In Column 11, Line 16, delete "$E_{(i,.)}$," and insert -- $E_{(i,.)}$, $A_{(i,.)}$, --, therefor.

In Column 11, Line 45, delete "$T_{open}$ rate LGM" and insert -- $T_{open\ rate\ LGM}$ --, therefor.

In Column 13, Line 15, delete "$T_{fatigue}$ duration," and insert -- $T_{fatigue\ duration}$, --, therefor.

In Column 13, Line 22, delete "$T_{fatigue}$ duration," and insert -- $T_{fatigue\ duration}$, --, therefor.

In Column 13, Line 35, delete "$T_{fatigue}$ duration," and insert -- $T_{fatigue\ duration}$, --, therefor.

In Column 14, Line 13, delete "FIG. 4" and insert -- FIG. 4. --, therefor.

In Column 14, Line 58, delete "LGMresponse" and insert -- $LGM_{response}$ --, therefor.

In Column 14, Line 61, delete "LGMresponse" and insert -- $LGM_{response}$ --, therefor.

Signed and Sealed this
Twentieth Day of June, 2023

Katherine Kelly Vidal
*Director of the United States Patent and Trademark Office*

CERTIFICATE OF CORRECTION (continued)
U.S. Pat. No. 11,488,204 B2

In Column 14, Line 63, delete "LGMresponse" and insert -- $LGM_{response}$ --, therefor.

In Column 15, Line 18, delete "LGMresponse" and insert -- $LGM_{response}$ --, therefor.

In Column 15, Line 20, delete "LGMresponseless" and insert -- $LGM_{response}$ is less --, therefor.

In Column 15, Line 21, delete "localmean is is" and insert -- local mean is --, therefor.

In the Claims

In Column 18, Line 6, in Claim 2, delete "computer-readable" and insert -- computer readable --, therefor.

In Column 18, Line 12, in Claim 3, delete "computer-readable" and insert -- computer readable --, therefor.

In Column 18, Line 25, in Claim 4, delete "computer-readable" and insert -- computer readable --, therefor.

In Column 18, Line 36, in Claim 5, delete "computer-readable" and insert -- computer readable --, therefor.

In Column 18, Line 47, in Claim 6, delete "computer-readable" and insert -- computer readable --, therefor.